United States Patent
Nield

[15] 3,676,404
[45] *July 11, 1972

[54] METHYL METHACRYLATE COPOLYMERS

[72] Inventor: Eric Nield, Watton-at-Stone, England

[73] Assignees: Imperial Chemical Industries Limited, London, England;

[ * ] Notice: The portion of the term of this patent subsequent to Nov. 25, 1986, has been disclaimed.

[22] Filed: June 9, 1970

[21] Appl. No.: 44,879

Related U.S. Application Data

[63] Continuation-in-part of Ser. No. 360,073, April 15, 1964, Continuation-in-part of Ser. No. 781,673, April 16, 1968.

[52] U.S. Cl. .............260/78 UA, 260/78.5 R, 260/80.6, 260/80.7, 260/80.76, 260/80.8, 260/80.81, 260/888, 260/891, 260/899, 260/901

[51] Int. Cl. ............................................C08f 19/10
[58] Field of Search ..........260/78 R, 78 UA, 78.5 NR, 85.7, 260/80.6, 80.8, 80.81, 86.1, 86.7

[56] References Cited

UNITED STATES PATENTS 3,480,598  11/1969  Nield .................................260/78.5

Primary Examiner—Joseph L. Schofer
Assistant Examiner—John Kight, III
Attorney—Cushman, Darby & Cushman

[57] ABSTRACT

Copolymers prepared from methyl methacrylate, electron deficient monomers, for example N-aryl maleimides and other ethylenically, unsaturated monomers copolymerisable therewith.

7 Claims, No Drawings

METHYL METHACRYLATE COPOLYMERS

This application is a continuation-in-part of application, Ser. Nos. 360,073, now abandoned and 781,673, filed 15th Apr. 1964 and 16th Oct. 1968 respectively. Ser. No. 781,673, now U.S. Pat. No. 3,480,598 being a continuation of Ser. No. 463,869 filed 14th June 1965, and now abandoned.

The present invention relates to new copolymers, particularly to copolymers of N-substituted maleimide and methyl methacrylate.

It has been proposed to make copolymers of maleimide and N-alkyl or N-aralkyl maleimides with various other monomers. Quite often it is found that when such copolymers are prepared the copolymer is more brittle than the homopolymer obtainable from the monomer with which said maleimide or N-substituted maleimide is copolymerized, even although the copolymer may have better physical properties than the homopolymer in certain other respects. It is also often found that the water absorption is appreciably increased as compared with the homopolymer of the other monomer.

Polymethyl methacrylate is an organic polymeric material of considerable commercial value. It has great utility and is widely used for many different applications. It is a thermoplastic material which means that it softens and can be shaped or moulded when heated to high temperatures. For some purposes it would be an advantage if a polymer having all the useful properties of polymethyl methacrylate but having a higher softening point could be produced. It is however particularly important that such an increase should not be accompanied by an increase in the brittleness nor water absorption of the polymer.

It has been proposed to make certain copolymers of methyl methacrylate and α-methyl styrene to achieve this end, but the production of such copolymers is made difficult by the slow rate of polymerization of α-methyl styrene and the consequent difficulty of avoiding heterogeneity in the products.

We have now found that improvements in this effect can be achieved by providing copolymers of methyl methacrylate, an electron deficient monomer and another ethylenically unsaturated monomer.

According to the present invention we provide a copolymer of (i) methyl methacrylate, (ii) a polymerizable monomer that is more electron-deficient than methyl methacrylate, selected from the group consisting of maleic anhydride, maleimide and its N-substituted derivatives, and (iii) another ethylenically unsaturated compound selected from the group consisting of α-methyl styrene, vinyl acetate, esters of acrylic acid, esters of methacrylic acid other than methyl methacrylate, vinyl chloride, vinylidene chloride, styrene and halogen substituted styrenes, vinyl and isopropenyl ethers and dienes, which is copolymerizable with both said methyl methacrylate and said electron-deficient monomer, in which:

when the said electron-deficient monomer is N-aryl maleimide the copolymer consists essentially of from 65 to 99 percent by weight of methyl methacrylate units, 1 to 35 percent by weight of N-aryl maleimide units and 0 to 15 percent by weight of units of said ethylenically unsaturated compound, and when the said other ethylenically unsaturated compound is α-methyl styrene the copolymer consists essentially of from 45 to 99 percent by weight of methyl methacrylate units, and from 55 to 1 percent by weight of α-methyl styrene units and units of said electron-deficient monomer taken together, said electron deficient monomer units being in the proportion of 0.05 to 2 moles per mole of said α-methyl styrene units.

We have also found that improvements are achieved by providing copolymers of methyl methacrylate and N-aryl maleimides.

According to another aspect of the present invention we also provide copolymers of methyl methacrylate and N-aryl maleimides, containing from 65 to 99 percent by weight of methyl methacrylate units, 1 to 35 percent by weight of units derived from said N-aryl maleimide, and 0 to 15 percent by weight of units derived from any other ethylenically unsaturated compound copolymerizable with both said methyl methacrylate and said N-aryl maleimide. We also provide a process wherein the ingredients to form the copolymers are polymerized together.

It will be appreciated that the nature of the copolymers will be determined at least in part by the relative proportions of the component monomers. Therefore, while we provided a wide range of useful copolymers, in order to obtain a copolymer which is a modified form of polymethyl methacrylate that is mouldable and shapeable in much the same way as polymethyl methacrylate, we prefer to limit the proportion of N-aryl maleimide in order to obtain this effect and also the hereinbefore mentioned advantages of increased softening point without substantial increase in water absorption as compared with polymethylmethacrylate and, where possible, an avoidance of a substantial increase in brittleness as compared with polymethyl methacrylate. Therefore in order to get the best combination of high softening point, no substantial increase in brittleness or water absorption, and good moulding properties, as compared in order to obtain this effect and also the hereinbefore mentioned advantages of increased softening point without substantial increase in water absorption as compared with polymethyl methacrylate, in a preferred form of our invention we provide copolymers of methyl methacrylate and N-aryl maleimides, containing from 80 to 95 percent by weight of methyl methacrylate units, 5 to 20 percent by weight of N-aryl maleimede units, and 0 to 15 percent by weight of units derived from any other ethylenically unsaturated compound copolymerizable with both said methyl methacrylate and N-aryl maleimide.

It will be appreciated that in our copolymers the N-aryl maleimide units may be derived from a mixture of maleimides.

N-aryl maleimides that we have found to be particularly suitable for use in our invention include N-phenyl maleimide and substituted derivatives thereof in which at least one of the aromatically bound hydrogen atoms has been substituted by a halogen atom, a nitro group, a nitrile group, aryl, aryloxy, aralkyl, aralkoxy, aryloxy alkyl or an alkyl or alkoxy group containing from one to four carbon atoms. It will be appreciated that these substituted derivatives of N-phenyl maleimide may themselves be substituted. Other N-aryl maleimides that may be used include N-α-naphthyl maleimide and derivatives thereof.

Of the N-(halogen-substituted phenyl) maleimides we prefer the bromo- or chloro-substituted derivatives because of their ready availability. Examples are N-(2-chloro-phenyl) maleimide, N-(3-chloro-phenyl) maleimide, N-(4-chloro-phenyl) maleimide, N-(4-bromo-phenyl) maleimide, N-(2,4,6-trichloro-phenyl) maleimide and N-(2,4,6-tribromo-phenyl) maleimide. Other N-(substituted phenyl) maleimides which may be used include N-(2-methyl-phenyl) maleimide, N-(3-methyl-phenyl) maleimide, N-(4-methyl-phenyl) maleimide, N-(2-t-butyl-phenyl) maleimide, N-(3-t-butyl-phenyl) maleimide, N-(4-t-butyl-phenyl) maleimide, N-(2,6-dimethyl-phenyl) maleimide, N-(2-nitro-phenyl) maleimide, N-(3-nitro-phenyl) maleimide, N-(4-nitro-phenyl) maleimide, N-(2,4-dinitro-phenyl) maleimide, N-(2-methoxy-phenyl) maleimide, N-(3-methoxy-phenyl) maleimide, N-(4-ethoxy-phenyl) maleimide, N-(4-cyano-phenyl) maleimide, N-(2-methyl-4-chloro-phenyl) maleimide, N-4-phenyl phenyl maleimide, N-4-phenyloxy phenyl maleimide, N-4-benzyl phenyl maleimide, N-4-benzyloxy phenyl maleimide, N-4-phenoxy methyl phenyl maleimide and N-2-chloro-4-phenoxy phenyl maleimide.

We prefer to use N-(substituted-phenyl) maleimides having a substituent in the 2-position on the phenyl radical attached to the nitrogen atom, because the use of such substituted maleimides leads to the production of copolymers with a greater freedom from color than is possible with other substituted N-phenyl maleimides. N-(2-chloro-phenyl) maleimide is particularly effective in this regard. Where a copolymer having good flame resistance is required, it is advantageous to use an N-aryl maleimide containing a high proportion by weight of chlorine or bromine substituents.

The third monomer which may provide units forming from 0 to 15 percent by weight of the copolymer is preferably one that has no adverse effect on the properties of the copolymer, and normally the reason for including such a third copolymerizable component is to modify the properties of the copolymer in some desirable manner, e.g. by increasing the flow properties when heated to moulding temperatures, or to reduce any residual color in the copolymer, or by using a polyfunctional monomer to introduce some degree of cross-linking. Suitable monomers for these purposes include vinyl esters, esters of acrylic acid e.g. methyl and ethyl acrylate, esters of methacrylic acid other than methyl methacrylate, e.g. butyl methacrylate and ethyl hexyl methacrylate, vinyl chloride, vinylidene chloride, styrene, $\alpha$-methyl styrene and the various halogen substituted styrenes, vinyl and isopropenyl ethers, dienes such as 1,3-butadiene and divinyl benzene. Reduction in color of the copolymer can be effected by reducing the residual maleimide in the copolymer and this is best effected by using as the third copolymerizable component a monomer which is electron rich e.g. a vinyl ether, vinyl acetate, styrene or $\alpha$-methyl styrene.

The copolymer can be prepared by any of the well known polymerization processes, i.e. in bulk, in solution, in aqueous emulsion or in aqueous suspension. When using a solvent process the organic compound used as the solvent should not react with any of the monomers, and preferably should have little or no chain transfer effect on the polymerization reaction. Our copolymers may also be made in bulk by the continuous process described in our British specification, No. 875,853 and our U.S. specification, No. 3,234,303.

The polymerization may be effected at any desired temperature, preferably in the presence of a free radical yielding catalyst that is active at the polymerization temperature. A particularly useful temperature range is 0° to 120° C. and catalysts suitable for use in this range include $\alpha\alpha'$-azo-di-isobutyronitrile and benzoyl peroxide or other organic peroxides and hydroperoxides. Normally the amount of catalyst required to give useful results lies between 0.05 and 2 percent by weight of the polymerizable monomers.

Ancillary ingredients may be added at any convenient stage during the manufacture of the copolymers or they may be blended with the copolymer after it has been made. Examples of such ingredients include fillers (e.g. glass fibers), pigments, heat and light stabilizers, plasticizers, lubricants, flame retardants and mould release agents. The copolymers may be blended with other polymeric materials e.g. synthetic rubbers.

Our copolymers are extremely useful for moulding many different kinds of articles, particularly articles that may have to be exposed to relatively high ambient temperatures. Further the strength and clarity of our transparent copolymers whether prepared as glass-like sheets or as moulding powders makes them suitable for use as windows or in any other shaping or moulding where either transparency or a bright colored form is required and where the shaping or moulding is to be exposed to relatively high ambient temperatures.

The properties of our copolymers may be improved, particularly in regard to impact resistance, and craze resistance by incorporating therein rubbery polymeric materials e.g. rubbery copolymers of butadiene-1,3 and styrene, methyl methacrylate or acrylonitrile; saturated polymeric rubbers e.g. polyethyl acrylate and the rubbery copolymers of the lower alkyl acrylates e.g. those containing 1 to 4 carbon atoms in the alcohol moiety and the rubbery copolymers of ethylene with for example vinyl acetate and methyl methacrylate. The extrusion properties of such compositions may be improved by using these rubbery materials in a substantially cross-linked form such as may be obtained for example by masticating the copolymers of butadiene, or by including a small amount of a cross-linking monomer in the polymerization recipe used for the preparation of the rubbery polymeric material. Useful amounts of these rubbery materials may be from 10 to 100 percent by weight preferably 20 to 45 percent based on the weight of the copolymer of methyl methacrylate and the N-aryl maleimide.

The rubber may be included by any conventional mixing technique. Alternatively the ingredients to form the rubber may be polymerized in the presence of the already formed copolymer of methyl methacrylate and N-aryl maleimide. Alternatively the ingredients to form the copolymer of methyl methacrylate and N-aryl maleimide may be polymerized in the presence of the already formed rubber.

In a preferred form of our invention we therefore provide a composition comprising our copolymer of methyl methacrylate and N-aryl maleimide with from 10 to 100 percent by weight based on the weight of the copolymer of a rubbery polymeric material.

Another object of the present invention is the provision of copolymers of methyl methacrylate and $\alpha$-methyl styrene having an increased softening point which can be made by a relatively rapid process.

According to yet another aspect of the present invention we provide a polymeric product of a methyl methacrylate, $\alpha$-methyl styrene and at least one polymerizable monomer that is more electron deficient than methyl methacrylate and selected from the group consisting of maleic anhydride and maleimide and its N-substituted derivatives, the product containing from 45 to 99 percent by weight of methyl methacrylate units, and from 55 to 1 percent by weight of $\alpha$-methyl styrene units and units of said electron deficient monomer taken together, said electron deficient monomer units being in the proportion of 0.05 to 2 moles per mole of said $\alpha$-methyl styrene units.

Further in accordance with our invention we provide a process for the production of polymeric products in which a mixture of monomers is polymerized, said mixture consisting essentially of 45 to 99 percent by weight of the mixture of methyl methacrylate, and from 55 to 1 percent by weight of said mixture of $\alpha$-methyl styrene and one or more monomers more electron deficient than methyl methacrylate, said electron deficient monomer or monomers being in the proportion of 0.05 to 2 moles per mole of said $\alpha$-methyl styrene.

In general we prefer that the electron deficient monomer should be in an amount not greater than one mole per mole of $\alpha$-methyl styrene.

We prefer to use methyl methacrylate because polymeric products based on methyl methacrylate have the greatest utility as regards hardness and general suitability for making moulded products, than any other alkyl methacrylate.

We prefer that methyl methacrylate units comprise from 55 to 95 percent by weight of our polymeric product because these proportions cover the most generally useful part of our range of products. More particularly we prefer that the methyl methacrylate units should comprise from 60 to 90 percent by weight of the product because within this range products have properties usually associated with polymethyl methacrylate. With less than 60 percent of methyl methacrylate the polymers tend to be brittle, and with greater than 95 percent of methyl methacrylate an effective increase in the softening point may not be achieved.

In order to determine whether a monomer is more electron deficient than methyl methacrylate, reference may be made to Journal of Polymer Science Volume 54, 1961, pages 411 – 455, particularly page 444. The monomers listed are characterized by a factor "$e$" which is a copolymerization parameter which depends upon the polar properties of the monomer. Accordingly electron deficient monomers which may be used in our invention are those which have a greater positive value of "$e$" than the value of methyl methacrylate. We prefer that the value of "$e$" for the electron deficient monomer should be appreciably greater than the value for methyl methacrylate, which is 0.40. Thus we prefer to use electron deficient monomers having a value of "$e$" greater than 0.8.

Where it is required that our polymeric products should have softening points greater than that of polymethyl methacrylate it is generally necessary that the electron deficient monomer should be capable (actually or theoretically) of forming a homopolymer that has a softening point substantially the same as, or greater than that of polymethyl methacrylate. Examples of such monomers are maleimide and its N-substituted derivatives, maleic anhydride, and methylene malonic esters.

Examples of other monomers that may be used in our invention but which do not necessarily yield polymeric products having softening points greater than that of polymethyl methacrylate include methyl acrylate, methacrylic acid, acrylic acid, n-octyl acrylate, butyl acrylate, vinyl trifluoroacetate, acrylamide, diethyl fumarate and dimethyl fumarate.

It will be appreciated that our copolymers can include a small amount of a monomer which is less electron deficient than methyl methacrylate in order to obtain some additional advantageous effect whether or not accompanied by an improvement in the softening point provided that the advantages of the presence of the α-methyl styrene and the electron deficient monomer are not substantially reduced.

The methyl methacrylate and α-methyl styrene copolymers hereinbefore described may also be blended with normal ancillary ingredients, e.g. dyestuffs, pigments, plasticizers, stabilizers, fillers and other polymeric material. Rubber-like polymeric materials may usefully be added to increase the impact resistance of our copolymers.

Our invention is illustrated but in no way limited by the following Examples in which all parts are expressed by weight.

EXAMPLE 1

Methyl methacrylate 90 parts, N-phenyl maleimide 10 parts, and benzoyl peroxide 0.1 part, were mixed together in a vessel and heated to form a syrup.

A cell was prepared from two rectangular sheets of glass separated from each other by a distance of 0.32 cms. by means of a flexible gasket around the periphery of the glass sheets. The glass cell was filled with the syrup and then maintained at 70° C. for 65 hours and then at 110° C for one hour. The glass plates were separated leaving a sheet of solid polymer which was found to have a reduced viscosity of 6.2 (measured as a 0.5 percent solution in chloroform at 25° C.) and a Vicat softening point of 129° C. When this polymer was saturated with water the Vicat softening point fell to 114° C.

The sheet so made was transparent, and could be shaped into useful articles.

For comparison a sheet of polymethyl methacrylate made in a similar manner had the following properties:

| | |
|---|---|
| Reduced Viscosity | 10.96 |
| Vicat softening point | 123.5° C |
| Vicat softening point after saturation with water | 104.1°C |

EXAMPLE 2

The process of Example 1 was repeated using the following materials:

| | |
|---|---|
| N-o-tolyl maleimide | 10 parts |
| Methyl methacrylate | 90 parts |
| Benzoyl peroxide | 0.1 part |

A polymer was obtained having reduced viscosity of 6.6 (measured as a 0.5 percent solution in chloroform at 25° C), and a Vicat softening point of 128° C. When a piece of this polymer was saturated with water its Vicat softening point fell to 113°. The sheet so made was transparent and free from color.

EXAMPLE 3

Example 2 was repeated with varying amounts of N-o-tolyl maleimide but carrying out the polymerization for 20 hours at 70° C. followed by heating at 110° C. for 2 hours. The following table shows the amounts of monomers used, and the reduced viscosities and Vicat softening points of the polymers obtained.

| N-o-tolyl maleimide Parts | Methyl methacrylate Parts | Reduced viscosity (0.5% solution in chloroform at 25 °C.) | Vicat Softening Point °C. |
|---|---|---|---|
| 4 | 16 | 2.1 | 137.5 |
| 6 | 14 | 2.1 | 147.5 |
| 8 | 12 | 1.5 | 150 |

EXAMPLE 4

A syrup was prepared as in Example 1 from the following materials:

| | |
|---|---|
| Methyl methacrylate | 22.5 parts |
| N-2-chlorophenyl maleimide | 2.5 parts |
| Benzoyl peroxide | 0.025 part |

The syrup was then poured into a cell formed by two glass plates spaced apart at a distance of 0.32 cms. by means of a flexible gasket and the filled cell was maintained at 65° – 70° C for 18 hours and then at 110° C. for one hour. The polymer had a reduced viscosity (measured as a 0.5 percent solution in chloroform at 25° C.) of 8.6 and a Vicat softening point of 127° C. When saturated with water the Vicat softening point fell to 112° C.

EXAMPLE 5

The procedure of Example 4 was repeated using the following materials:

| | |
|---|---|
| Methyl methacrylate | 22.5 parts |
| N-4-chlorophenyl maleimide | 2.5 parts |
| Benzoyl peroxide | 0.025 part |

A cell was similarly filled and maintained at 65° C for 22 hours and then at 110° C. for two hours. The resulting polymer had a reduced viscosity as hereinbefore defined of 8.6 and a Vicat softening point of 126° C.

EXAMPLE 6

A copolymer sheet was made exactly as in Example 5 using the following materials:

| | |
|---|---|
| Methyl methacrylate | 23.75 parts |
| N-α-naphthyl maleimide | 1.25 parts |
| Benzoyl peroxide | 0.025 part |

The polymer had a reduced viscosity, as hereinbefore defined of 8.26, and a Vicat softening point of 125° C.

EXAMPLE 7

This Example comprises the properties of certain N-aryl maleimide/methyl methacrylate copolymers with copolymers of methyl methacrylate and maleimide, N-methyl maleimide and N-benzyl maleimide respectively. The copolymers were prepared as described in Example 6 and the properties of the copolymers are shown in the following Table:

| Methyl methacrylate | Comonomer | Vicat softening Point as made | Water absorption | Vicat softening point when saturated with water |
|---|---|---|---|---|
| 90 parts | N-phenyl maleimide 10 parts | 129°C | 2.28% by weight | 114°C |
| 90 parts | N-o-tolyl maleimide 10 parts | 128°C | 2.18% by weight | 113.4°C |
| 90 parts | N-2-chlorophenyl maleimide 10 parts | 127°C | 2.55% by weight | 112°C |
| 85 parts | Maleimide 15 parts | 134°C | 4.55% by weight | 105°C |
| 90 parts | N-methyl-maleimide | 128°C | 2.9% | 104°C |

| | | | by weight | |
|---|---|---|---|---|
| 10 parts | | | | |
| 90 parts | N-benzyl maleimide | 124°C | 2.72% | 104.6°C |
| 10 parts | | | by weight | |

The water absorption was measured by immersing a piece of the polymer in boiling water until it was saturated with water and then measuring its change in weight.

As can be seen from this table the three N-aryl maleimides illustrated vis. N-phenyl maleimide, N-o-tolyl maleimide and N-2-chloro-phenyl maleimide showed a fall in Vicat softening point but not nearly as great a fall as that shown by maleimide, the N-alkyl maleimide (N-methyl maleimide) and the N-aralkyl maleimide (N-benzyl maleimide). Further the amount of water absorbed was less in the case of the three N-aryl maleimide copolymers than in the case of the other three copolymers. The latter three copolymers became hazy when they absorbed water whereas the former copolymers remained transparent.

EXAMPLE 8

The following materials were added to a stirred autoclave:

| | |
|---|---|
| Methyl methacrylate | 15 parts |
| N-phenyl maleimide | 5.19 parts |
| Water | 100 parts |
| Potassium persulphate | 0.5 part |
| Sodium lauryl sulphate | 0.5 part |

The monomers were dispersed by vigorous stirring and maintained at 60° C. for about 24 hours. A stable polymer dispersion was obtained from which the polymer was precipitated by the addition of a saturated solution of sodium chloride. The polymer thus obtained was filtered and thoroughly washed with water and then dried. The polymer had a reduced viscosity (as hereinbefore defined) of 9.1 and a Vicat softening point of 133.5° C.

EXAMPLE 9

A polymerization process was carried out as in Example 8 using the following materials:

| | |
|---|---|
| Methyl methacrylate | 15 parts |
| N-o-tolyl maleimide | 5.61 parts |
| Water | 100 parts |
| Potassium persulphate | 0.5 part |
| Sodium lauryl sulphate | 0.5 part |

The dried polymer had a reduced viscosity as hereinbefore described of 9.6 and a Vicat softening point of 145° C.

EXAMPLE 10

The following materials were fed into a vessel:

| | |
|---|---|
| Methyl methacrylate | 5 parts |
| N-phenyl maleimide | 1.73 parts |
| Methanol | 16 parts |
| αα'-azodiisobutyronitrile | 0.05 part |

The vessel was sealed and evacuated and maintained at 60° C. for 24 hours. The resulting polymer was filtered from the methanol, dissolved in chloroform, reprecipitated into ether, filtered and dried in vacuo. It was found to have a reduced viscosity of 0.71 (as hereinbefore defined) and a Vicat softening point of 140.5° C.

EXAMPLE 11

A solution of N-o-tolyl maleimide (10 parts) and benzoyl peroxide (0.7 part) in methyl methacrylate (90 parts) was dispersed in an equal volume of a buffered solution of sodium polymethacrylate (0.06 part) in water (100 parts). The dispersion was placed in a flask equipped with a reflux condenser and a stirrer and was heated to reflux temperature until polymerization was complete, as shown by a maximum in the temperature of the reactants.

The product consisted of spherical granules. After water washing, filtering and drying a compression moulding was made. The Vicat softening point was found to be 125° C. The reduced viscosity of the polymer (as hereinbefore defined) was approximately 2.0.

EXAMPLE 12

A solution of N-2-chlorophenyl maleimide (10 parts) αα'-azodiisobutyronitrile (0.2 part) and tertiary lauryl mercaptan (2.0 parts) in methyl methacrylate (90 parts) was dispersed in a solution of "Polyox" WSR 301, a polyethylene glycol dispersing agent (0.4 part) in water (100 parts) and polymerized as in Example 11.

The product had a reduced viscosity of 1.5 (hereinbefore described) and a compression moulding had a Vicat softening point of 128° C.

EXAMPLE 13

Syrup was formed from α-methyl styrene (1.2 part), N-o-tolyl maleimide (1.9 part), methyl methacrylate (22 parts), benzoyl peroxide (0.025 part) and heated at ca. 70° C, in a glass cell for 20 hours and then for one hour at 110° C. The resulting polymer was transparent and had a reduced viscosity of 2.7 and a Vicat softening point of 130° C.

EXAMPLE 14

A solution of N-2-chlorophenyl maleimide (10 parts), styrene (10 parts) and αα'-azodiisobutyronitrile (0.1 part) and tertiary lauryl mercaptan (2.0 parts) in methyl methacrylate, (80 parts) was dispersed in an equal volume of a buffered solution of sodium polymethacrylate (0.06 part) in water (100 parts) and polymerized as in Example 11. The product had a reduced viscosity of 1.2 and a compression moulding had a Vicat softening point of 126° C.

EXAMPLE 15

A solution of N-2-chlorophenyl maleimide (10 parts), vinyl isobutyl ether (5 parts), lauroyl peroxide (0.5 part) and lauryl mercaptan (0.3 part) in methyl methacrylate (85 parts) was dispersed in an equal volume of a solution of "Polyox" WSR 301, a polyethylene glycol dispersing agent (0.4 part) in water (100 parts) and polymerized as in Example 11.

The product had a reduced viscosity of 1.0 and a Vicat softening point of 122° C. (on a compression moulding).

EXAMPLE 16

A solution of N-2-chlorophenyl maleimide (10 parts) α-methyl styrene (15 parts) and αα'-azodicyclohexane carbonitrile (0.2 part) in methyl methacrylate (75 parts) was dispersed in an equal volume of "Polyox" WSR 301 (0.4 part) in water (100 parts). The mixture was placed in a stainless steel pressure vessel equipped with a stirrer and was stirred at a temperature of 100° C. for 2 hours.

The product, consisting of spherical granules, had a reduced viscosity of 0.35 and a compression moulding had a Vicat softening point of 122° C.

EXAMPLE 17

To deionized water (1273 parts) containing sodium lauryl sulphate (1.2 parts) was added ethyl acrylate (202 parts), glycol dimethacrylate (1 part) and potassium persulphate (0.4 part) and the whole was heated to 65°–70° C. under a nitrogen atmosphere. When the ensuing reaction had subsided the whole mixture was heated to 85° C. for 15 minutes, cooled to 80° C. and a mixture of methyl methacrylate (40 parts) and glycol dimethacrylate (0.4 part) added and the whole maintained at 80° C. for 20 minutes, then at 85° C. for 15 minutes and then cooled to room temperature.

To this latex (1515 parts about 16 percent solids) was added methyl methacrylate (860 parts), tertiary lauryl mercaptan (20 parts), lauroyl peroxide (2.5 parts) and N-2-chlorophenyl maleimide (95.5 parts). When the aryl maleimide had dissolved, water (500 parts) was added. To this mixture was added hydrated aluminum sulphate (0.35 part) dissolved in water (20 parts) and after 5 minutes further stirring, sodium polyacrylate (0.6 part), anhydrous disodium phosphate (1.3 parts) and monosodium phosphate dihydrate (4.6 parts) were added and the whole contents were heated to reflux temperature (82° C.).

After holding at 82° C. for 50 minutes the temperature rose spontaneously to 90° C., after heating to 97° C. and holding for 10 minutes, the polymer particles were centrifuged off, washed, dried and injection moulded.

The translucent-grey mouldings produced had superior falling weight impact strength, Vicat softening point and detergent craze resistance compared with injection moulded polymethyl methacrylate, or methyl methacrylate/N-2-chlorophenyl maleimide copolymer or a polymethyl methacrylate-polyethylacrylate rubber blend prepared as above but with the omission of N-2-chloro-phenyl maleimide.

EXAMPLE 18

A solution of methyl methacrylate (70 parts), α-methyl styrene (20 parts) and N-o-chlorophenyl maleimide (10 parts) was emulsified in water (150 parts) containing sodium lauryl sulphate (0.15 part) and potassium persulphate (0.38 part). The mixture was heated to 80° C. (reflux) and held there; after 50 minutes the temperature rose spontaneously to 89° C. On raising the temperature to 100° C. only very small quantities of α-methyl styrene were stripped off, showing that polymerization was substantially complete.

A similar polymerization using no aryl maleimide took four hours to reach 90 percent polymerization and no spontaneous temperature rise was noted.

EXAMPLE 19

The following mixture was prepared and warmed gently to form a syrup:

| | |
|---|---|
| Maleic anhydride | 11 parts |
| α-Methyl styrene | 14 parts |
| Methyl methacrylate | 22.5 parts |
| Benzoyl peroxide | 0.25 part |

The syrup thus obtained was poured into a cell formed by two parallel flat sheets of glass spaced apart by means of a flexible peripheral gasket a distance of one-eighth inch. The filled cell was maintained at 65°–70° C. for 17 hours and then at 110° C. for 2 hours. The glass plates were then separated from the sheet of solid polymer formed by this process which was colorless and transparent and had a Vicat softening point of 119° C. and a reduced viscosity of 1.43 measured as a 0.5 percent solution in chloroform at 25° C.

For comparative purposes this Example was repeated exactly as before but omitting the maleic anhydride and using 23.6 parts of methyl methacrylate in place of the 22.5 parts. It was not possible to form a syrup before filling the cell, and at the end of the process the contents of the cell were in the form of a syrup and no solid polymer was formed.

EXAMPLE 20

The following mixture was prepared and warmed gently to form a syrup:

| | |
|---|---|
| Maleimide | 11 parts |
| α-Methyl styrene | 14 parts |
| Methyl methacrylate | 22.5 parts |
| Benzoyl peroxide | 0.25 part |

A cell was prepared and filled and heated exactly as described in Example 19. A solid sheet of polymer was obtained that was transparent and colorless, had a Vicat softening point of 129° C. and a reduced viscosity of 1.5 measured as a 0.5 percent solution in chloroform at 25° C.

EXAMPLE 21

| | |
|---|---|
| Water | 100 parts |
| Ethylene/maleic anhydride copolymer | 0.03 part |
| Sodium dihydrogen phosphate | 3 parts | were placed in a five liter autoclave which was then purged with nitrogen, and 100 parts of polymerizable monomers and 0.2 part of azodicyclohexanecarbonitrile added. The 100 parts of polymerizable monomers were made up from varying amounts of methyl methacrylate, α-methyl styrene and N-orthochlorophenylmaleimide. The polymerization time for each composition was measured and is recorded in the following table:

| polymerizable Monomers | | | | |
|---|---|---|---|---|
| methyl methacrylate | α-Methyl Styrene | N-ortho-chloro-phenyl maleimide | Polymerization Temp. | Polymerization Time |
| 82.5 parts | 7.5 parts | 10 parts | 105°C | 150 min. |
| 82.5 parts | 10 parts | 7.5 parts | 105°C | 180 min. |
| 85.0 parts | 6 parts | 9 parts | 105°C | 95 min. |
| 90.0 parts | 10 parts | 0 part | 105°C | °300 min. |
| 95.0 parts | 5 parts | 0 part | 105°C | >300 min. |
| 97.5 parts | 2.5 parts | 0 part | 80°C | 200 min. |

From the table we see that the copolymerization rate of methyl methacrylate and α-methyl styrene is substantially increased by the presence of N-orthochlorophenylmaleimide which is more electron deficient than methyl methacrylate.

EXAMPLE 22

Similar experiments to that of Example 21 were carried out using maleimide or maleic anhydride in place of the N-orthochlorophenylmaleimide. The polymerization times for these compositions are shown in the following table:

| Monomers | | | | |
|---|---|---|---|---|
| methyl methacrylate | α-Methyl Styrene | Electron deficient monomer | Polymerization Temp. | Polymerization Time |
| 90 parts | 5 parts | 5 parts maleimide | 100°C | 120 min. |
| 90 parts | 5 parts | 5 parts maleic anhydride | 100°C | 150 min. |
| 90 parts | 10 parts | 0 part | 105°C | >300 min. |

Again we see that the polymerization time is substantially reduced by the addition of maleimide or maleic anhydride, both of which are more electron deficient than methyl methacrylate.

I claim:

1. A copolymer of (i) methyl methacrylate, (ii) a polymerizable monomer that is more electron-deficient than methyl methacrylate, selected from the group consisting of maleic anhydride, maleimide and its N-substituted derivatives, and (iii) another ethylenically unsaturated compound selected from the group consisting of vinyl acetate, esters of acrylic acid, esters of methacrylic acid other than methyl methacrylate, vinyl chloride, vinylidene chloride, styrene and halogen substituted styrenes, vinyl and isopropenyl ethers and dienes, which is copolymerizable with both said methyl methacrylate and said electron-deficient monomer, in which:

when the said electron-deficient monomer is N-aryl maleimide the copolymer consists essentially of from 65 to 99 percent by weight of methyl methacrylate units, 1 to 35 percent by weight of N-aryl maleimide units and 0 to 15 percent by weight of units of said ethylenically unsaturated compound.

2. A copolymer of methyl methacrylate and N-aryl maleimide consisting essentially of from 65 to 99 percent by weight of methyl methacrylate units, 1 to 35 percent by weight of N-aryl maleimide units, and 0 to 15 percent by weight of units of other ethylenically unsaturated compounds copolymerizable with both said methyl methacrylate and said N-aryl maleimide, said other ethylenically unsaturated compounds being selected from the group consisting of vinyl acetate, esters of acrylic acid, esters of methacrylic acid other than methyl methacrylate, vinyl chloride, vinylidene chloride, styrene, α-methyl styrene and halogen substituted styrene, vinyl and isopropenyl ethers, and dienes.

3. A copolymer according to claim 2 consisting essentially of from 80 to 95 percent by weight of methyl methacrylate units, 5 to 20 percent by weight of N-aryl maleimide units and 0 to 15 percent of said any other polymerizable compound.

4. A copolymer according to claim 2 in which said N-aryl maleimide is selected from the group consisting of N-phenyl maleimide, substituted derivatives thereof in which at least one of the aromatically bound hydrogen atoms has been substituted by a halogen atom or an alkyl group containing from one to four carbon atoms and N-α-naphthyl maleimide.

5. A copolymer according to claim 4 in which in said N-aryl maleimide at least one of the aromatically bound hydrogen atoms has been substituted by a chlorine or bromine atom.

6. A copolymer according to claim 4 in which in said N-phenyl maleimide the aromatically bound hydrogen atom attached to the 2-position on the phenyl radical has been substituted.

7. A copolymer according to claim 2 in which the monomer which provides residues forming from 0 to 15 percent by weight of the copolymer is selected from styrene and vinyl ethers.

* * * * *